(12) United States Patent
Kuningas (10) Patent No.: US 8,774,854 B2
(45) Date of Patent: *Jul. 8, 2014

(54) CELL TYPE INFORMATION SHARING BETWEEN NEIGHBOR BASE STATIONS

(76) Inventor: Tarmo Kuningas, Sollentuna (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,549

(22) Filed: Jul. 23, 2012

(65) Prior Publication Data

US 2012/0289284 A1    Nov. 15, 2012

Related U.S. Application Data

(63) Continuation of application No. 13/126,034, filed as application No. PCT/SE2009/051220 on Oct. 26, 2009, now Pat. No. 8,254,982.

(60) Provisional application No. 61/109,344, filed on Oct. 29, 2008.

(51) Int. Cl.
*H04B 7/00* (2006.01)
*H04W 36/00* (2009.01)

(52) U.S. Cl.
USPC ........................................ 455/525; 455/443

(58) Field of Classification Search
USPC ........ 455/525, 422.1, 432.1, 432.3, 436–449; 370/331, 338, 328
See application file for complete search history.

(56) References Cited

U.S. PATENT DOCUMENTS 7,929,970 B1 * 4/2011 Gunasekara et al. ......... 455/444
8,086,234 B2 * 12/2011 Paul et al. ..................... 455/436
8,254,982 B2 * 8/2012 Kuningas ...................... 455/525
8,355,378 B2 * 1/2013 Taaghol et al. ................ 370/331
2008/0219216 A1 9/2008 Taaghol et al.
2008/0318576 A1 * 12/2008 So et al. ........................ 455/436
2009/0046599 A1 2/2009 Pollakowski et al.
2009/0046665 A1 * 2/2009 Robson et al. ................ 370/332
2009/0150557 A1 6/2009 Wormley et al.
2009/0179755 A1 7/2009 Bachl et al.
2010/0075667 A1 3/2010 Nakamata et al.
2010/0208693 A1 8/2010 Centonza (Continued)

FOREIGN PATENT DOCUMENTS

EP    1411741 A1    4/2004
WO    2008041911 A2    4/2008

(Continued)

OTHER PUBLICATIONS

Realnetworks Inc., et al., "Format for HTTP Streaming Media Presentation Description," 3GPP SA4-MBS SWG on MBS_Ext, Jan. 25-29, 2010, St. Julian, Malta, Tdoc S4-100020.

(Continued)

*Primary Examiner* — Brandon Miller (57) ABSTRACT

The present invention relates to a method and arrangement for cell type information sharing between neighbor base stations in a telecommunications system. One embodiment comprises informing a second radio base station serving a second cell and having a neighbor relation with a first cell served by a first base station, of at least the cell type of the first cell. This is accomplished by adding the cell type information to a set of information to be signaled to the second base station, and then signalling the set of information to the second base station.

18 Claims, 4 Drawing Sheets

(56) References Cited

U.S. PATENT DOCUMENTS

| | | |
|---|---|---|
| 2010/0263021 A1 | 10/2010 | Arnott et al. |
| 2010/0285802 A1* | 11/2010 | Ahluwalia et al. ............ 455/436 |
| 2011/0009119 A1 | 1/2011 | Breuer et al. |
| 2011/0044279 A1 | 2/2011 | Johansson et al. |
| 2011/0060837 A1 | 3/2011 | Zhai et al. |
| 2011/0171979 A1 | 7/2011 | Rune |
| 2012/0233345 A1 | 9/2012 | Hannukela |
| 2012/0285802 A1* | 11/2012 | Scott et al. .................... 198/788 |

FOREIGN PATENT DOCUMENTS

| | | |
|---|---|---|
| WO | 2008099340 A1 | 8/2008 |
| WO | 2008137376 A2 | 11/2008 |
| WO | 2009154529 A1 | 12/2009 |

OTHER PUBLICATIONS

Ericsson et al., "Addition of cell type to neighbouring and served cell information", 3GPP TSG-RAN3 Meeting #63bis, Mar. 23-26, 2009, Seoul, Korea, R3-090823.

3rd Generation Partnership Project, "Evolved Universal Terrestrial Radio Access Network (EUTRAN); X2 application protocol (X2AP)", Technical Specification Group Radio Access Network, Dec. 2007, 3GPP TS 36.423 V8.0.0 (Release 8).

* cited by examiner

CELL TYPE INFORMATION SHARING BETWEEN NEIGHBOR BASE STATIONS

RELATED APPLICATIONS

This application is a continuation of U.S. patent application Ser. No. 13/126,034, which is a national stage application of PCT/SE2009/051220, filed Oct. 26, 2009, which claims the benefit of U.S. Provisional Application Ser. No. 61/109,344 filed Oct. 29, 2008, the disclosures of each of which are incorporated herein by reference in their entirety.

TECHNICAL FIELD

The present invention relates to a method and arrangement in a telecommunications system, in particular it relates to a method and arrangement for cell type information sharing in a telecommunications system.

BACKGROUND

In a typical cellular radio system, also referred to as a wireless communication system, user equipments, also known as mobile terminals and/or wireless terminals communicate via a Radio Access Network (RAN) to one or more core networks. The user equipments can be mobile stations or user equipment units such as mobile telephones also known as "cellular" telephones, and laptops with wireless capability, e.g. mobile termination, and thus can be, for example, portable, pocket, hand-held, computer-included, or car-mounted mobile devices which communicate voice and/or data with radio access network.

The radio access network covers a geographical area which is divided into cell areas, with each cell area being served by a base station, e.g., a Radio Base Station (RBS), which in some networks is also called "eNB", "NodeB" or "B node" and which in this document also is referred to as a base station. A cell is a geographical area where radio coverage is provided by the radio base station equipment at a base station site. The base stations communicate over the air interface operating on radio frequencies with the user equipment units within range of the base stations.

In some version of the radio access network, several base stations are typically connected, e.g., by landlines or microwave, to a Radio Network Controller (RNC). The radio network controller, also sometimes termed a Base Station Controller (BCS), supervises and coordinates various activities of the plural base stations connected thereto. The radio network controllers are typically connected to one or more core networks.

The radio access technologies for cellular mobile networks are continuously being evolved to meet the future demands for higher data rates, improved coverage and capacity. Examples of recent evolutions of the WCDMA access technology are HSPA (High-Speed Packet Access). Currently further evolutions of the 3G systems, 3G Long Term Evolution (LTE), including new access technologies and new architectures are being developed within the 3rd Generation Partnership Project (3GPP) standardization body among others with the aim to provide support for functions like inter cell load balancing, inter cell interference coordination, optimisation of mobility control (in case of hierarchical cell structures), distributed physical cell identity allocation/selection, etc.

All these functions require certain information about the characteristics and role of the neighbouring cells, information which could be provided to a base station, sometimes called NodeB or eNodeB, as part of information on a handover of a mobile terminal, sometimes called UE or mobile station e.g. together with UE History Information.

This however involves collecting a lot of statistical handover information as well and is not an especially quick or flexible procedure.

Cell type has been defined in 3GPP specification often as:
macro, micro, pico, femto [1];
large, (medium), small [2];
wide area, (medium area), local area [3].

The size of the cell coverage area and the cell hierarchy level may but are not necessarily coupled, e.g. two cells may both have large coverage area but depending on the purpose in the radio network, those two cells may belong to different level in cell hierarchy.

SUMMARY

It is an object of the present invention to provide a solution for exchanging neighbour cell type information between base stations of a communications system that at least to a certain extent alleviates one or some of the problems indicated above.

It is also an object of the present invention to provide a solution for a neighbour cell type update in a base station that captures both radio network hierarchy and cell size aspects.

At least one of the above objects is achieved with the method or base station according to the example aspects and embodiments of the invention herein described.

Further objects and advantages are evident from the following.

A first aspect of the present invention relates to a method in a first radio base station serving a first cell in a wireless communication system, for informing a second radio base station serving a second cell that has a neighbour relation with the first cell, of at least the cell type of the first cell.

A first method step of the first aspect of the invention involves adding the cell type to a set of information to be signaled to the second base station.

A second method step of the first aspect of the invention involves signalling the set of information to the second base station.

In one embodiment of the first aspect, the information is signaled over an X2 interface.

In another embodiment of the first aspect, the information is signaled during an X2 setup procedure and/or an eNodeB Configuration Update procedure.

A further embodiment of the first aspect involves also or alternatively adding information of the cell types of other cells having a neighbour relation with the first cell to the set of information to be signaled to the second base station.

Another embodiment of the first aspect involves in return receiving in the first base station, information on the cell type of the cell served by the second base station.

The return information may in yet another embodiment of the first aspect also or alternatively include the cell types of other cells having a neighbour relation with the second cell served by the second base station.

In a further embodiment of the first aspect, the cell type information, i.e. cell size and hierarchical level, is for use by at least one of the first and second base station in handover evaluation of a specific UE.

A second aspect of the present invention relates to a first radio base station serving a first cell in a wireless communication system capable of exchanging cell type information including cell size and hierarchical level with a second base station serving a second cell that has a neighbour relation with the first cell, wherein the base station comprises means arranged to perform the method according to the first aspect of the invention.

The present invention according to the aspects and embodiments thereof herein described provides the advantage that a base station, such as an eNodeB, quickly and without collecting extra statistical handover information from a UE is updated with the cell type of a neighbour cell, something which is useful for at least one of:

inter cell load balancing,
inter cell interference coordination,
optimisation of mobility control (in case of hierarchical cell structures), and
distributed physical cell identity allocation/selection.

Those skilled in the art will appreciate further advantages resulting from the information made available by several embodiments of the present invention.

The features described above in relation to the method according to the invention may, where applicable, also be implemented in an arrangement according to the invention with the same advantages as described in relation to the method. It goes without saying that the above aspects of the invention may be combined in the same embodiment.

ABBREVIATIONS

UE User Equipment
DL Downlink
UL Uplink
IE Information Element
TNL Transport Network Layer
PCI Physical Cell Identity

DETAILED DESCRIPTION

In the discussion that follows, the present inventive methods and apparatus are described in the context of an LTE/SAE wireless network. In this case, many of the control functions described herein reside in an eNodeB 310. However, those skilled in the art will appreciate that the inventive techniques described herein are applicable to other network types and other network configurations. For example, the inventive methods and apparatus disclosed herein may be applicable to an evolved High-Speed Packet Access (HSPA) architecture, in which the Radio Network Controller (RNC) is integrated into the NodeB, as well as to a Release 99 GERAN/UTRAN architecture, in which the neighbor cell type information described below might be transferred between peer control nodes (e.g., RNCs and/or Base Station Controllers). Thus, the description of the invention in terms of LTE/SAE network elements is meant to be illustrative, not limiting.

Briefly described, the present invention involves a method and arrangement for exchanging cell type information between network nodes serving neighbour cells, such as base stations for example eNodeB base station, of a telecommunications system wherein the neighbour cell type information is added to the served cell information and/or to the neighbour information signaled between the neighbour base stations.

Figure 3:
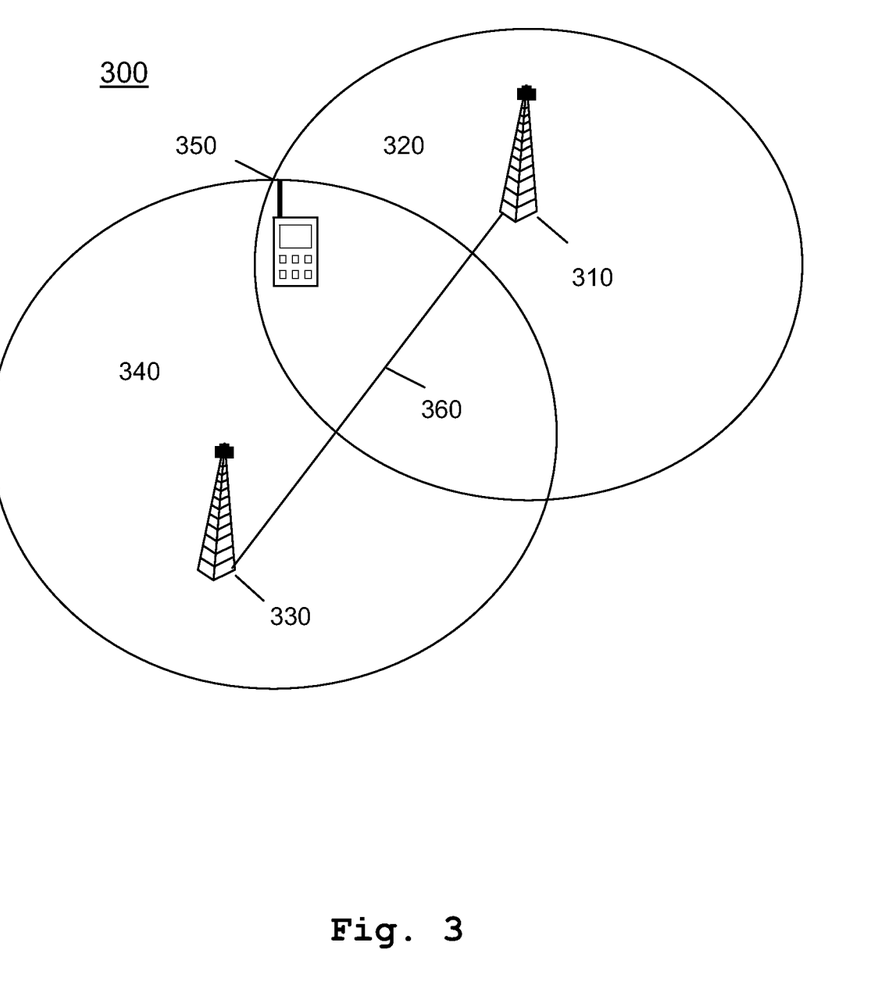
FIG. 3 is a schematic illustration of neighbour base stations exchanging cell type information.

FIG. 3 schematically illustrates a cell type information exchange between neighbour base stations in an LTE/SAE network 300. Here each base station 310, 330 serves a respective cell 320, 330, which have a neighbour relation as being direct neighbors, i.e. in direct proximity and, in this example overlapping each other. It is possible but not required for cells of neighbor or proximate base station to overlap, or even the one cell to be fully encompassed in the other, to be considered as neighbor cells. Cells may also be considered neighbors when having their respective cell edges at a distance from each other leaving a non-served space there between, i.e. providing an area with no cell coverage.

Figure 4:
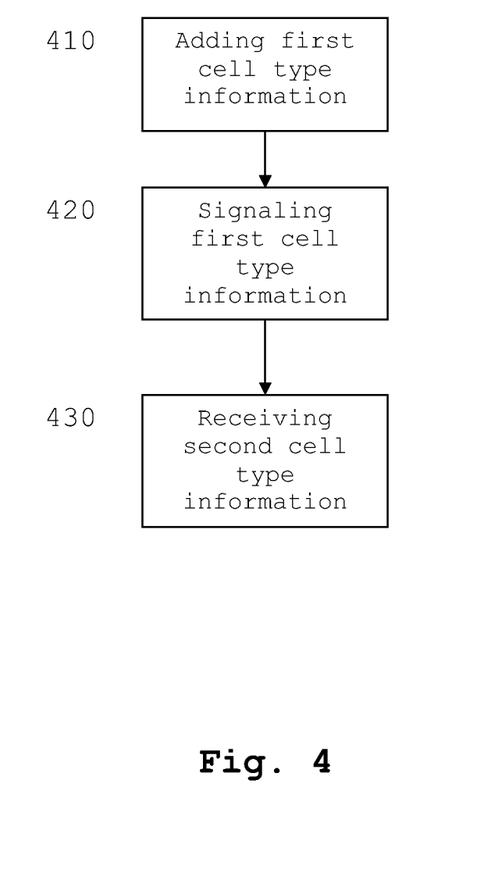
FIG. 4 is a logic flow diagram of one embodiment of a method for exchanging cell type information.

FIG. 4 thus provides an illustration of an exemplary method for cell type information sharing between base stations, as might be implemented, for example, in an eNodeB 310 of an LTE/SAE wireless communication system. Those skilled in the art will appreciate that some steps illustrated in FIG. 4 may be omitted. Furthermore, steps may be performed in a different order than shown.

The method of FIG. 4 "begins" at block 410, where cell type information such as cell size and/or cell hierarchical level data for cells served by the (first) base station, for example eNodeB 310, is added to a list of its served cells to be signaled to a neighbor (second) base station, such as eNodeB 330.

In some embodiments the cell type information is added to a set of information in a message to be signaled to the neighbor base station, such as an X2 setup request message or an eNodeB configuration update message.

In some embodiments, the cell type information is provided in the form an information element IE such as a Neighbor Information IE comprising a Cell Type IE or a Served Cell IE comprising cell configuration information including Cell Type IE. The Cell Type IE, according to some embodiments, indicates respective cell characteristics of the served cells such as one or both of cell size and cell hierarchical level. The cell type information could also or alternatively include other cell characteristic data such as a flag or indicator for indicating if a cell is providing service to a closed subscriber group or to all users of the mobile network.

At block 420, the cell type information is signaled to the neighbor base station, such as eNodeB 330, over an X2 interface. The signaling could then be provided as part of an X2 setup procedure or eNodeB configuration update procedure.

In some embodiments the neighbor (second) base station, for example eNodeB 330, responds by transmitting in return a list of its served cells with corresponding cell type information defined for each listed cell. This list or cell type information is received in the (first) base station at block 430.

In some embodiments, also or alternatively cell type information of direct neighbors of the first and/or second base station is added to the set of information signaled.

In some embodiments, the cell type information is exchanged over an S1 interface in a corresponding way to that described for the X2 interface.

Basically the present invention enables neighbour base stations, such as eNodeBs 310 and 330, to exchange necessary cell characteristics over the X2 interface 360 using X2AP, X2 Setup and/or eNB Configuration Update procedures instead of basing any decisions of (neighbour) cell characteristics on the information provided e.g. with UE History Information.

One advantage of having the cell characteristics at X2 Setup and/or eNB Configuration Update is that the base stations do not have to collect statistical information from the handovers of each individual mobile terminal, i.e. UE. However, the cell type is not currently, see ref. [1] 3GPPTS36.423v8.3.0, among cell information signaled to the neighbouring base stations or eNodeBs while the knowledge of cell type (the level of the neighbour cell in radio network hierarchy and the size of the neighbour cell) are important for functions like inter cell load balancing, inter cell interference coordination, optimisation of mobility control (in case of hierarchical cell structures), distributed physical cell identity allocation/selection, etc.

There are also a few usage examples where the cell type information could be useful to exchange before any statistics provided per UE is available or when the UE History information could not be trusted (e.g. in a multivendor environment), namely:

If the radio network has been deployed with hierarchical cell structures then load balancing between different cells would be most efficient if the UE is handed over to the smaller cell. The idea behind the offloading traffic to a smaller cell (on a lower hierarchy level) is that smaller cell should have lower probability to capture traffic.

The cell size is an important characteristic also for handover optimization of fast moving UEs where one option would be to keep the UE on the same size or larger cell where the cell changes could be less frequent.

Another possible use of cell type is distributed PCI (Physical Cell Identity) selection/allocation. The important aspect for PCI selection are the cell size because of it has direct relation to the number of neighbour cells this particular cell has and the cell hierarchy level as it defines the type of neighbour relation in the hierarchy. The PCI selection/allocation algorithm may assign different PCI reuse factors for each cell size and cell hierarchy level combination, Similar to the previous example, in case of homogenous network where macro cell refers to high hierarchy and large cell size, micro cell to medium hierarchy and medium cell size, etc then macro, micro, pico and femto would be sufficient. However, in case of an inhomogeneous network, where in one place the highest hierarchy cell could only have a medium cell size, and a nearby highest hierarchy cell may have large cell size then the PCI selection/allocation algorithm may not be able to produce desirable outcome (there could be too many cells that result in PCI confusion, i.e. the source eNB could not uniquely identify the target cell only based on the PCI).

The cell types macro, micro, pico and femto can also be used for optimised radio resource management. Here are a few examples how Cell Type information could be used for radio resource management:

If the radio network has been deployed with hierarchical cell structures then one option would be to keep the UE that is moving fast on the same size cell/hierarchy level cell or larger cell/lower hierarchy level cell (where the cell changes would be less frequent). Similarly, another option would be to keep the UE that is moving slowly or not at all on the same size cell/hierarchy level cell or smaller cell/higher hierarchy level cell.

Now:

In case of homogeneous network, i.e. definition of cell hierarchy is aligned and the cells on one hierarchy level have relatively similar size, then the definition [1] above, i.e. macro, micro, pico, femto, would be sufficient as e.g. macro cell would indicate both large cell and higher position in the cell hierarchy. Such a network could be within dense urban area.

In case of inhomogeneous network, i.e. definition of the cell hierarchy could change and/or the cells on one hierarchy level may have significantly different size, definition ([1] through [3] separately would not provide sufficient information about the topology change. Such a network could e.g. be at the border of a dense urban area and an urban area. In such a scenario a cell type definition that explicitly provides information about cell hierarchy level and cell size is the only option to detect the change in the radio network topology.

In the following, various embodiments of the invention will be described.

Addition of Cell Type to Served Cell Information

Served Cell Information:

This example served cell information element IE comprises cell configuration information of a cell including a cell type IE that a neighbour base station, such as an eNodeB, may need for the X2 AP interface.

| IE/Group Name | Presence | Range | IE type and reference | Semantics description | Criticality | Assigned Criticality |
|---|---|---|---|---|---|---|
| PhyCID | M | | INTEGER (1 ... 504, ... ) | Physical Cell ID | — | — |
| Cell ID | M | | ECGI 9.2.16 | | — | — |
| TAC | M | | OCTET STRING | Tracking Area Code | — | — |
| Broadcast PLMNs | | 1 ... <maxnoof BPLMNs> | | Broadcast PLMNs | — | — |
| >PLMN Identity | M | | 9.2.6 | | — | — |
| UL EARFCN | M | | EARFCN 9.2.28 | Corresponds to NuL in ref. [16] | — | — |
| DL EARFCN | M | | EARFCN 9.2.28 | Corresponds to NdL in ref. [16] | — | — |
| Cell Transmission Bandwidth | M | | 9.2 29 | | — | — |
| Cell Type | O | | 9.2.x | | — | — |

Addition of the Cell Type to Neighbour Information

Figure 1:
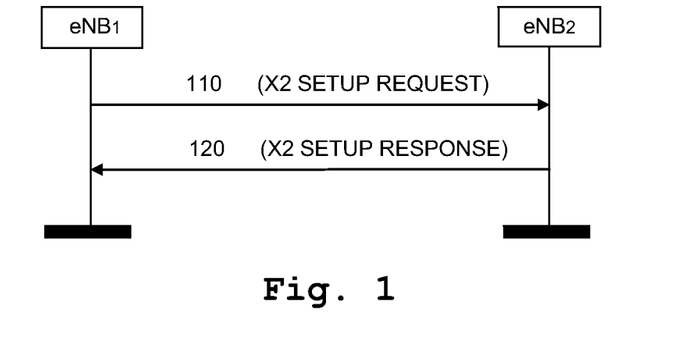
FIG. 1 is an example illustration of cell type information exchange via an X2 setup procedure.

In FIG. 1 is illustrated an example embodiment of a successful cell type information exchange via a X2 setup procedure where an eNodeB base station $eNB_1$ initiates the procedure by sending 110 an X2 SETUP REQUEST message, e.g. the example X2 SETUP REQUEST message of below, to a candidate eNodeB base station $eNB_2$. Candidate eNodeB replies 120 with an X2 SETUP RESPONSE message, e.g. the example X2 SETUP RESPONSE message of below. The initiating eNodeB transfers a list of served cells to the candidate eNodeB. Candidate eNodeB replies with a list of its served cells.

The initiating eNodeB may include the Neighbour Information IE in the X2 SETUP REQUEST message. The candidate eNodeB may also include the Neighbour Information IE in the X2 SETUP RESPONSE message where the Neighbour Information IE may contain the Cell Type IE. The Neighbour Information IE shall only include cells that are direct neighbours of cells in the reporting eNodeB.

Figure 2:
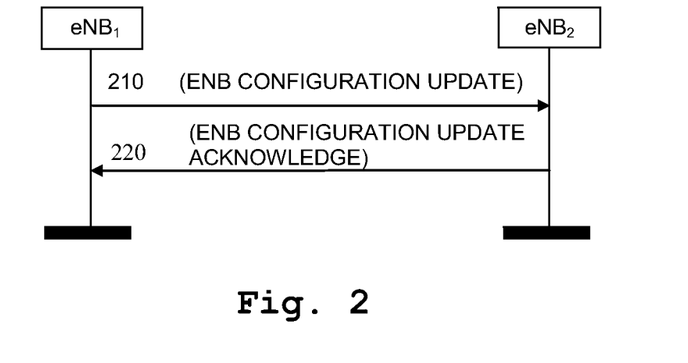
FIG. 2 illustrates a cell type information exchange via an eNodeB Configuration Update procedure.

In FIG. 2 is illustrated an example embodiment of a successful cell type information exchange via an eNodeB Configuration Update procedure where the first eNodeB base station $eNB_1$ initiates the procedure by sending 210 an ENB CONFIGURATION UPDATE message, e.g. the example ENB CONFIGURATION UPDATE message of below, to a peer eNodeB base station $eNB_2$.

Upon reception of an ENB CONFIGURATION UPDATE message, $eNB_2$ shall update the information for $eNB_1$, for example as follows:

Update of Served Cell Information:

If Served Cells To Add IE is contained in the ENB CONFIGURATION UPDATE message, $eNB_2$ shall add cell information according to the information in the Served Cell Information IE.

If Served Cells To Modify IE is contained in the ENB CONFIGURATION UPDATE message, $eNB_2$ shall modify information of cell indicated by Old ECGI IE according to the information in the Served Cell Information IE.

If Served Cells To Delete IE is contained in the ENB CONFIGURATION UPDATE message, $eNB_2$ shall delete information of cell indicated by Old ECGI IE.

Update of GU Group ID List:

If GU Group Id To Add List IE is contained in the ENB CONFIGURATION UPDATE message, $eNB_2$ shall add the GU Group Id to its GU Group Id List.

If GU Group Id To Delete List IE is contained in the ENB CONFIGURATION UPDATE message, $eNB_2$ shall remove the GU Group Id from its GU Group Id List.

Update of Neighbour Information:

If Neighbour Information IE is contained in the ENB CONFIGURATION UPDATE message, $eNB_2$ may use this information to update its neighbour cell relations, or use it for other functions, like PCI selection. The Neighbour Information IE shall only include cells that are direct neighbours of cells in the reporting eNB. The Neighbour Information IE may contain the Cell Type IE.

After successful update of requested information, $eNB_2$ shall reply 220 with an ENB CONFIGURATION UPDATE ACKNOWLEDGE message to inform the initiating $eNB_1$ that the requested update of application data was performed successfully. In case the peer $eNB_2$ receives an ENB CONFIGURATION UPDATE without any information element, IE, except for Message Type IE it should reply with ENB CONFIGURATION UPDATE ACKNOWLEDGE message without performing any updates to the existing configuration.

X2 SETUP REQUEST Example

This message is sent by a base station, such as a first eNodeB, to a neighbouring base station, such as a second eNodeB, to transfer the initialization information for a Transport Network Layer, TNL, association.

Direction: eNB1→eNB2.

| IE/Group Name | Presence | Range | IE type and reference | Semantics description | Criticality | Assigned Criticality |
|---|---|---|---|---|---|---|
| Message Type | M | | 9.2.15 | | YES | reject |
| Global eNB ID | M | | 9.2.24 | | YES | reject |
| Served Cells | | 1 to maxCellineNB | | This is all the eNB cells | YES | reject |
| >Served Cell Information | M | | 9.2.10 | | — | — |
| >Neighbour Information | | 0 to maxnoofNeighbours | | | — | — |
| >>ECGI | M | | ECGI 9.2.16 | E-UTRAN Cell Global Identifier of the neighbour cell | — | — |
| >>PCI | M | | INTEGER (1 ... 504, ... ) | Physical Cell Identifier of the neighbour cell | — | — |
| >>Cell Type | O | | 9.2.x | | — | — |
| GU Group Id List | | 0 to maxfPools | | This is all the pools to which the eNB belongs to | YES | reject |
| >GU Group Id | M | | 9.2.22 | | — | — |

| Range bound | Explanation |
| --- | --- |
| maxCellineNB | Maximum no. cells that can be served by an eNB. Value is 256. |
| maxnoofNeighbours | Maximum no. of neighbour cells associated to a given served cell. Value is 144. |
| maxPools | Maximum no. of pools an eNB can belong to. Value is 16 FFS. |

X2 SETUP RESPONSE Example

This return message is sent by a base station such as a second eNodeB to a neighbouring base station such as a first eNodeB to transfer the initialization information for a TNL association.

Direction: eNB2→eNB1.

| IE/Group Name | Presence | Range | IE type and reference | Semantics description | Criticality | Assigned Criticality |
| --- | --- | --- | --- | --- | --- | --- |
| Message Type | M | | 9.2.15 | | YES | reject |
| Global eNB ID | M | | 9.2.24 | | YES | reject |
| Served Cells | | 1 to maxCellineNB | | This is all the eNB cells | YES | reject |
| >Served Cell Information | M | | 9.2.10 | | — | — |
| >Neighbour Information | | 0 to maxnoofNeighbours | | | — | — |
| >>ECGI | M | | ECGI 9.2.16 | E-UTRAN Cell Global Identifier of the neighbour cell | — | — |
| >>PCI | M | | INTEGER (1 ... 504, ... ) | Physical Cell Identifier of the neighbour cell | — | — |
| >>Cell Type | O | | 9.2.x | | — | — |
| GU Group Id List | | 0 to maxPools | | This is all the pools to which the eNB belongs to | YES | reject |
| >GU Group Id | M | | 9.2.22 | | — | — |
| Criticality Diagnostics | O | | 9.2.9 | | YES | ignore |

| Range bound | Explanation |
| --- | --- |
| maxCellineNB | Maximum no. cells that can be served by an eNB. Value is 256. |
| maxnoofNeighbours | Maximum no. of neighbour cells associated to a given served cell. Value is 144. |
| maxPools | Maximum no. of pools an eNB can belong to. Value is 16 FFS. |

ENB CONFIGURATION UPDATE Example

This message is sent by an eNB to a peer eNB to transfer updated information for a TNL association.

Direction: eNB1→eNB2.

| IE/Group Name | Presence | Range | IE type and reference | Semantics description | Criticality | Assigned Criticality |
| --- | --- | --- | --- | --- | --- | --- |
| Message Type | M | | 9.2.15 | | YES | reject |
| Served Cells To Add | | 0 to maxCellineNB | | | GLOBAL | reject |

-continued

| IE/Group Name | Presence | Range | IE type and reference | Semantics description | Criticality | Assigned Criticality |
|---|---|---|---|---|---|---|
| >Served Cell Information | M | | 9.2.10 | | — | — |
| >Neighbour Information | | 0 to maxnoofNeighbours | | | — | — |
| >>ECGI | M | | ECGI 9.2.16 | E-UTRAN Cell Global Identifier of the neighbour cell | — | — |
| >>PCI | M | | INTEGER (1 ... 504, ... ) | Physical Cell Identifier of the neighbour cell | — | — |
| >>Cell Type | O | | 9.2.x | | GLOBAL | reject |
| Served Cells To Modify | | 0 to maxCellineNB | | | | |
| >Old ECGI | M | | ECGI 9.2.16 | This is the old E-UTRAN Cell Global Identifier | — | — |
| >Served Cell Information | M | | 9.2.10 | | — | — |
| >Neighbour Information | | 0 to maxnoofNeighbours | | | — | — |
| >>ECGI | M | | ECGI 9.2.16 | E-UTRAN Cell Global Identifier of the neighbour cell | — | — |
| >>PCI | M | | INTEGER (1 ... 504, ... ) | Physical Cell Identifier of the neighbour cell | — | — |
| >>Cell Type | O | | 9.2.x | | GLOBAL | reject |
| Served Cells To Delete | | 0 to maxCellineNB | | | | |
| >Old ECGI | M | | ECGI 9.2.16 | This is the old E-UTRAN Cell Global Identifier of the cell to be deleted | — | — |
| GU Group Id To Add List | | 0 to maxPools | | | GLOBAL | reject |
| >GU Group Id | M | | 9.2.22 | | — | — |
| GU Group Id To Delete List | | 0 to maxPools | | | GLOBAL | reject |
| >GU Group Id | M | | 9.2.22 | | — | — |

| Range bound | Explanation |
|---|---|
| maxCellineNB | Maximum no. cells that can be served by an eNB. Value is 256. |
| maxnoofNeighbours | Maximum no. of neighbour cells associated to a given served cell. Value is 144. |

-continued

| Range bound | Explanation |
|---|---|
| maxPools | Maximum no. of pools an eNB can belong to. Value is 16 FFS. |

It should be noted that the proposed way of defining cell type allows future additions of cell characteristics, roles, etc. One such example could be a flag indicating if a cell is providing service to closed subscriber group or to all users of the mobile network.

Figure 5:
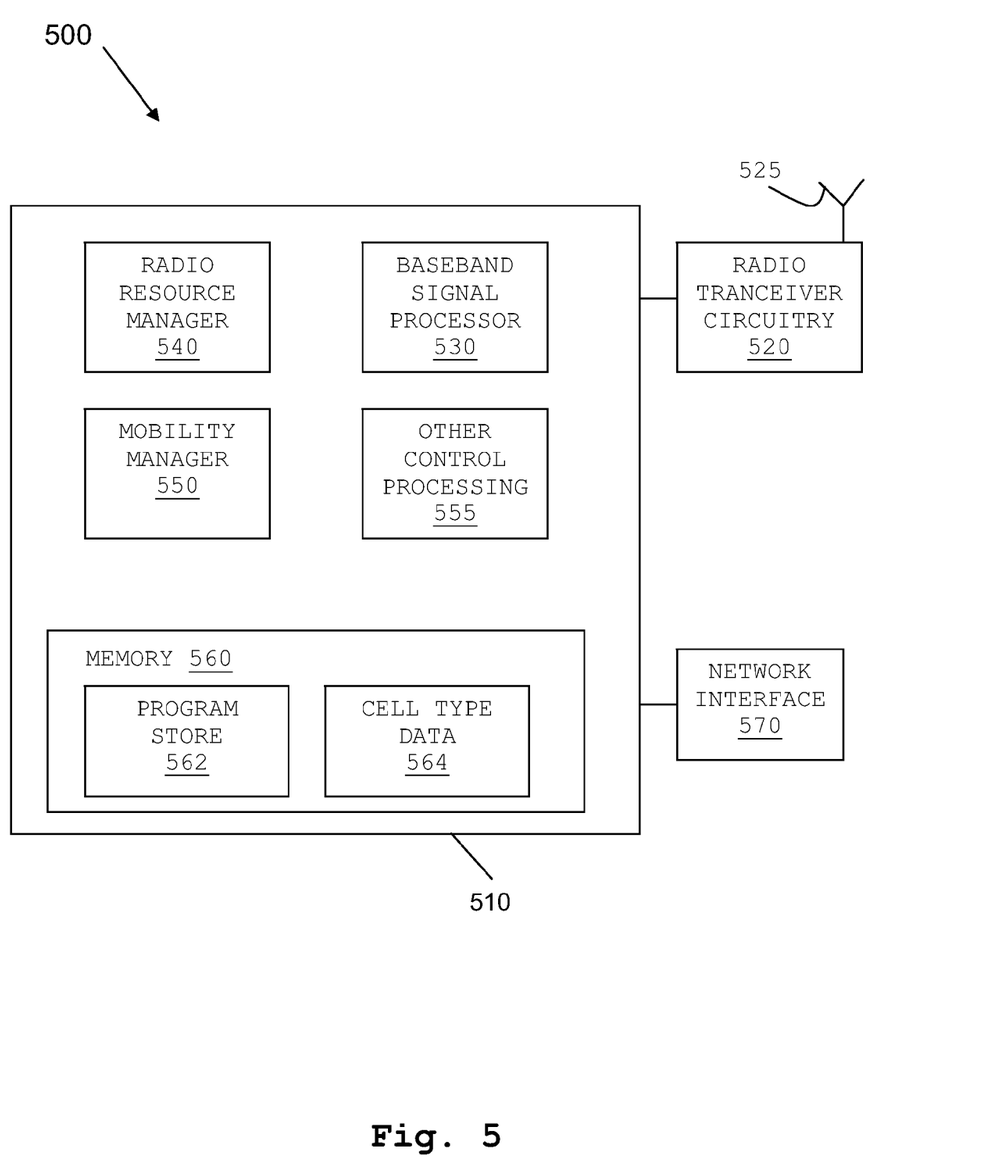
FIG. 5 is a block diagram of one embodiment of a base station configured to exchange cell type information.

Referring now to FIG. 5, an exemplary base station 500 that may be used to implement one or more of the methods described herein is pictured. Those skilled in the art will appreciate that the illustrated base station 500 is just one example of a control node for implementing the methods described herein. Many of the functions of control processor 510, in particular, may be implemented using a separate device, which might be co-located with conventional base station equipment or located remotely from the base station. Thus, the control node functionality may be part of an eNodeB in an LTE/SAE system, for example, or may be a separate control function in any other network. For instance, as discussed above, the control node functionality may be part of a radio network controller (RNC) or a base station controller. Thus, a control function may be associated with a single base station or several base stations.

In any event, the exemplary base station 500 of FIG. 5 includes a processing unit 510 configured for communication with one or more mobile stations using radio transceiver circuitry 520 and antenna 525. Base station 500 further includes a network interface 570 for communication with other elements of a wireless network, including, in some embodiments, other base stations 500 and access gateways such as the LTE/SAE access gateways. Those skilled in the art will appreciate that in some embodiments base station 500 may comprise an eNodeB for use in an LTE/SAE wireless communication system, but the inventive methods and apparatus described herein are applicable to other wireless network standards and other network configurations as well. Generally speaking, radio transceiver circuitry 520 and portions of the processing unit 510, such as baseband signal processor 530, are configured to comply with one or more wireless telecommunications standards, such as those promulgated by 3GPP. For instance, by way of non-limiting example, baseband signal processor 530 may be configured to encode and decode signals in accordance with 3GPP LTE standards defining physical layer protocols for Orthogonal Frequency Division Multiple Access (OFDMA)-based downlink signals and Single Carrier Frequency Division Multiple Access (SC-FDMA) uplink signals.

Processing unit 510 includes, in addition to baseband signal processor 530, a radio resource manager 540, mobility manager 550, other control processing 555, and memory 560, which in turn comprises a program store 562 and other data needed for operation of the base station 500, including a list of served cells with respective cell type information 564. Here also cell type information of neighbor cells may be stored. Those skilled in the art will appreciate that FIG. 5 depicts a functional representation of the elements of processing unit 510. Accordingly, each of the pictured processing blocks may in some embodiments directly correspond to one or more commercially available or custom microprocessors, microcontrollers, or digital signal processors. In other embodiments, however, two or more of the functional blocks of 510 may be implemented on a single processor, while functions of other blocks are split between two or more processors. Likewise, memory 560 is representative of the one or more memory devices containing the software, firmware, and data used to implement base station functionality in accordance with one or more embodiments of the present invention. Thus, memory 560 may include, but is not limited to, the following types of devices: cache, ROM, PROM, EPROM, EEPROM, flash, SRAM, and DRAM.

Base station 500, and in particular, processing unit 510, may be configured to implement one or more of the methods described herein for exchanging neighbour cell type information. Accordingly, processing unit 510 may be configured to both transmit and in return receive a set of information including cell type information such as cell size and cell hierarchical level, from a neighbour base station in association with a X2 Setup and/or an eNB Configuration Update procedure. The neighbour cell type information is then exchanged through network interface 570, which in an LTE system may comprise an X2 interface, such as an X2AP, as defined by 3GPP specifications. The neighbour cell type information could alternatively be exchanged over an S1 interface as defined by 3GPP specifications, for example incorporated in the information signaling required for a corresponding S1 setup or eNB configuration update procedure. The processing unit 510 is further configured to add the cell type data to the setup request (X2 or S1) or eNB configuration update message; this cell type data may include cell size data, cell hierarchical level data as described earlier and/or other cell characteristic data such as a flag or indicator for indicating if cell is providing service to closed subscriber group or to all users of the mobile network. Processing unit 510 is further configured to transfer the message to a neighbour base station in association with an X2 or S1 Setup and/or eNB Configuration Update procedure.

In some embodiments, processing unit 510 may be configured to receive in return from the neighbour base station its corresponding cell type information in an X2 or S1 setup response message or in an eNB configuration update acknowledgement message.

In some embodiments, the corresponding cell type information of direct neighbors of both the initiating base station 500, such as the base station 310 of FIG. 3, and the candidate neighbour base station, such as base station 330 of FIG. 3, is included in the above described messaging exchange.

Computer program code for carrying out operations of the various control nodes discussed above with respect to FIGS. 1-5 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention was described above with reference to flowchart and/or block diagram illustrations of methods, devices, and/or computer program products in accordance with some embodiments of the invention. These flowchart and/or block diagrams thus illustrate exemplary operations for sharing neighbour cell information in accordance with various embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special-purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

When using the word "comprise" or "comprising" it shall be interpreted as non-limiting, i.e. meaning "consist at least of".

Herein described method steps of the invention may as already stated be implemented by software executed by a processor in one or several network nodes, such as, but not limited to, a radio base station also called NodeB or eNodeB and/or a mobile terminal also called UE or mobile station.

Means mentioned in the present description can thereby be software means, hardware means or a combination of both.

Any examples and terminology relating to 3GPP LTE standard being used herein should not be seen as limiting the scope of the invention, the methodology of which in principle can be applied to other systems as well, including e.g. WCDMA.

While various embodiments/variations of the present invention have been described above, it should be understood that they have been presented by way of example only, and not limitation. Thus, the breadth and scope of the present invention should not be limited by any of the above-described exemplary embodiments. Further, unless stated, none of the above embodiments are mutually exclusive. Thus, the present invention may include any combinations and/or integrations of the features of the various embodiments.

Additionally, while the processes described above and illustrated in the drawings are shown as a sequence of steps, this was done solely for the sake of illustration. Accordingly, it is contemplated that some steps may be added, some steps may be omitted and the order of the steps may be re-arranged.

REFERENCES

3GPP TS 36.423 v8.3.0
3GPP TS 36.133 v8.3.0
3GPP TS 25.104
3GPP TS 36.423
3GPP TS 36.331
3GPP TS 36.133
3GPP TS 36.413

What is claimed is:

1. A method in a first radio base station serving a first cell in a wireless communication system for informing a second radio base station of at least a cell type of the first cell, the second radio base station serving a second cell that has a neighbor relation with the first cell, the method comprising:

adding the cell type to a set of information to be signaled to the second radio base station; and signalling the cell type to the second radio base station as part of said set of information during a setup or configuration procedure.

2. The method according to claim 1, wherein the set of information is signaled over an X2 or S1 interface.

3. The method according to claim 1, further comprising adding cell types of other cells having a neighbor relation with the first cell to the set of information signaled to the second radio base station.

4. The method according to claim 1, further comprising receiving in return a cell type of the second cell served by the second radio base station.

5. The method according to claim 4, wherein the cell type received in return also includes cell types of other cells having a neighbor relation with the second cell served by the second radio base station.

6. The method according to claim 1, wherein the cell type comprises at least one of cell size and cell hierarchical level.

7. The method according to claim 1, wherein the set of information is for use by at least one of the first and second radio base station in handover evaluation of a specific user equipment.

8. The method according to claim 1, wherein the set of information comprises an indicator that indicates whether the first cell is providing service to a closed subscriber group.

9. A first radio base station serving a first cell in a wireless communication system, the first radio base station configured to exchange cell type information with a second radio base station serving a second cell that has a neighbor relation with the first cell, wherein the first radio base station comprises a processing unit configured to:

add a cell type of the first cell to a set of information to be signaled to the second radio base station over a network interface, and signal the cell type to the second radio base station as part of said set of information during a setup or configuration procedure.

10. The first radio base station according to claim 9, wherein the processing unit is further configured to receive a return transmission from said second radio base station comprising a cell type of the second cell served by the second radio base station.

11. The first radio base station according to claim 9, wherein the network interface is an X2 or S1 interface.

12. The first radio base station according to claim 9, wherein the cell type comprises at least one of cell size and cell hierarchical level.

13. The first radio base station according to claim 9, wherein the processing unit is further configured to add cell types of other cells having a neighbor relation with the first cell to the set of information which is signaled to the second radio base station.

14. The first radio base station according to claim 9, wherein the set of information comprises an indicator that indicates whether the first cell is providing service to a closed subscriber group.

15. The first radio base station according to claim 9, wherein the set of information is for use by at least one of the first and second radio base station in handover evaluation of a specific user equipment.

16. A method in a first radio base station serving a first cell in a wireless communication system, the method comprising:

receiving signaling during a setup or configuration procedure from a second radio base station that serves a second cell having a neighbor relation with the first cell, the signaling including a cell type associated with the second cell; and based on the cell type included in the received signaling, directing between which cells in the system a specific user equipment hands over.

17. The method according to claim 16, wherein the cell type characterizes the extent to which the second cell provides coverage for the wireless communication system in relation to other cells in the system.

18. The method according to claim 17, wherein the cell type characterizes at least one of:
the geographical size of the coverage area provided by the second cell, in relation to that provided by other cells in the system;
the size of the group of user equipments for which the second cell provides coverage, in relation to that for which other cells in the system provide; and
the priority with which the second cell provides coverage for user equipments in the coverage area of the second cell, in relation to the priority with which other cells provide coverage for user equipments in coverage areas that overlap the coverage area of the second cell.

* * * * *